United States Patent Office 3,388,139
Patented June 11, 1968

3,388,139
3-ENOL ETHERS OF PROGESTERONE AND
6-METHYL DERIVATIVES THEREOF
Alberto Ercoli, Milan, Italy, assignor, by mesne assignments, to Warner-Lambert Pharmaceutical Company, Morris Plains, N.J., a corporation of Delaware
No Drawing. Application Dec. 11, 1962, Ser. No. 243,743, now Patent No. 3,342,682, dated Sept. 9, 1967, which is a division of application Ser. No. 26,712, May 4, 1960, now Patent No. 3,240,671. Divided and this application Sept. 11, 1967, Ser. No. 666,978
Claims priority, application Italy, Feb. 6, 1960, 2,100/60
2 Claims. (Cl. 260—397.4)

This is a division of copending application Ser. No. 243,743 filed Dec. 11, 1962, now Patent No. 3,342,682 which application, in turn, is a division of copending application Ser. No. 26,712, filed May 4, 1960, and now U.S. Patent No. 3,240,671.

This invention relates to new physiologically active derivatives of progesterone having oral activity and to novel hormonal compositions comprising them.

It is well known that progesterone like other naturally occurring steroid hormones is not effective when given orally. Actually shortly after administration, it is either completely destroyed or eliminated after undergoing chemical transformations which negate the hormonal activity. For this reason, progesterone can be given by parenteral route only.

Obviously the oral route, besides being more acceptable and convenient to patients, has the advantage of allowing a better subdivision of the doses over the day and makes it possible to change the dosage in accordance with the condition being treated.

The search for progestational compounds orally effective has led to the modification, more or less drastically, of the structure of the naturally occurring hormone. It was thus possible to obtain new steroids, some derived from hormones of the androgen series, showing a more or less marked progestational effect by oral route.

Generally, the value of such new compounds is open to question. While the physiological effect of progesterone is highly specific, the progestational activity of the new steroids is frequently associated with other undesired side effects, for instance androgenic effects. It is evident that such compounds, which are destined to be substituted for progesterone in preparation for and maintenance of pregnancy, must be employed with caution, especially during gestation, because they can modify the sexual development of the female fetuses causing masculinization and thus producing pseudohermaphrodism.

It is an object of this invention to provide physiologically active derivatives of progesterone possessing an oral activity almost equal to that shown by the natural hormone when parenterally administered, in order to avoid using substitute products having the undesirable side effects mentioned above.

Another object is to provide a progestinic composition adapted to produce orally the specific physiological effects of the natural hormone.

A further object of the invention is to provide a process of conducting steroid therapy employing these compositions.

The foregoing objects have been achieved by the discovery that certain new alkyl and cycloalkyl enol ethers of progesterone as well as of 17α-hydroxy and acyloxy progesterone and other derivatives of progesterone, itself, and its 17α-hydroxy or acyloxy derivatives are powerful hormonal agents active by oral route. When a 17α-acyloxy group is present, it is preferably derived from a lower alkanoic acid, particularly acetic acid.

Such compounds, derived by the action of an alcohol on the Δ⁴-3-keto group of the steroid, have the typical structure of an ether of a Δ³,⁵-3-hydroxy steroid.

Some enol ethers of progesterone have already been described in the literature and normal biological testings have been carried out in order to estimate their progestational activity. Such an examination, however, was always limited to the parenteral administration of the compounds and their oral ingestion was never taken into consideration, the probable reason for this being that since the enol ethers are, as stated earlier, simple derivatives of the natural hormone, it was logical to think they had a quite similar behaviour and consequently possessed only a parenteral activity.

It has been confirmed, through careful pharmacological testing, what other researchers had found, that is, that the 3-enol ethers of progesterone are less effective than the natural hormone when given by injection.

Unexpectedly, however, we have found that certain new enol ethers, containing an open or cyclic chain hydrocarbon radical having from four to six carbon atoms, inclusive, exhibit an exceptionally high progestational activity when administered orally.

Accordingly, this invention comprises as the preferred compounds, enol ethers of progesterone and of 17α-hydroxy and acyloxy progesterone of the formula:

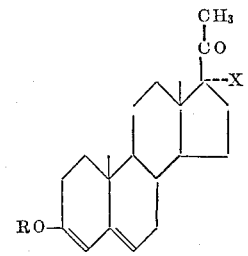

in which X is selected from the group consisting of hydrogen, a hydroxy group and an acyloxy group and R represents a saturated open or cyclic chain hydrocarbon radical, straight or branched, containing from four to six carbon atoms, inclusive and cyclohexenyl. As stated earlier, when X is an acyloxy group, it is preferred that it be a lower alkanoxyloxy group, particularly an acetoxy group.

While, as indicated, it is preferred that the compounds of the invention comprise enol ethers of the natural hormones, it is to be understood that advantages are to be obtained from the enol ethers of certain known derivatives thereof and this invention includes these enol ethers also. Thus the invention includes the 6-chloro, 6-methyl, 2-methyl, 16α- and 16β-methyl or 16-hydroxy 3-enol ethers of progesterone, 17α-hydroxy progesterone and 17α-acyloxy (particularly acetoxy) progesterone and the 17α-bromo or 17α-bromo, 6-methyl 3-enol ethers of progesterone, these 3-enol ethers also containing an open or cyclic chain hydrocarbon radical having four to six carbon atoms, inclusive.

The invention comprises also novel medicinal compositions containing the above-mentioned new compounds.

Particularly advantageous compounds for the compositions of this invention are butyl, amyl and hexyl enol ethers and the corresponding cyclic enol ethers, particularly cyclopentyl and cyclohexyl, of progesterone and 17α-acetoxy progesterone. The usual tests for the evaluation of progestational effect (Clauberg and McGinty tests) have proved that these enol ethers possess an exceptional oral activity. For instance, the 3-amyl enol ether of progesterone has been found to be ten times more active than the natural hormone and the 3-cyclopentyl enol ether of 17α-acetoxy progesterone exhibits an activity about eight times higher than 17α-acetoxy progesterone, itself. The new enol ethers of this invention exert a beneficial action as regards the maintenance of pregnancy, while they have proved to be devoid of masculinizing effects.

Moreover, they are quite non-toxic at high doses, as contrasted with progesterone and have the advantage of showing none of the side effects which are usually observed in the administration of progesterone, itself. For instance, they do not cause hypnosis.

The products which are the subject of the present invention can be administered by oral route in association with a suitable, liquid or solid, pharmaceutical carrier, but they are preferably given in solution in an orally ingestible lipid (oil or fat) such as, for instance, olive oil, sesame oil, linseed oil, sunflower seed oil, wheat germ oil, egg yolk oil, pine oil and the like, butter, lard margarine, cocoa butter, chocolate, etc. Such compositions can be administered as such or preferably in the form of a capsule, e.g., of gelatin or other material soluble or disintegrable in the alimentary tract.

The compositions of this invention are in dosage unit form containing one or more of the above-mentioned enolethers in an amount sufficient to produce therapeutic effects. In general, the amount is from about 1 mg. to about 40 mg., preferably 3 mg. to 30 mg. per dosage unit. The administration is by the oral route, advantageously in equal doses one to three times daily to give a daily dosage of from about 3 mg. to about 100 mg. and preferably from about 5 mg. to about 75 mg.

The new compounds of this invention can be obtained as disclosed in the copending application Ser. No. 26,711, filed of even date herewith, now Patent No. 3,019,241, and entitled "Process for the Preparation of $\Delta^4$-3-ketosteroids," by reacting a previously formed lower alkyl enol ether, generally the methyl or ethyl enol ether of progesterone or 17α-hydroxy or acetoxy progesterone or the abovementioned derivatives thereof with an excess of the chosen alcohol, in the presence of catalytic amounts of an acid catalyst. The alcohol employed may be an aliphatic alcohol, such as normal butyl, amyl, hexyl and their isomers, sec.-butyl, iso-amyl, (4-methyl)pentyl, (2-methyl)pentyl, (1,3-dimethyl)butyl, (2-ethyl)butyl and the like, or a cycloaliphatic alcohol, such as cyclopentanol, cyclohexanol or cyclohexenol.

As an acid catalyst, the sulfonic acids, such as toluenebenzene and naphthalene sulfonic acids can be advantageously employed.

Preferably the reaction is carried out in solution in a non-polar solvent such as benzene or a homologue thereof, cyclohexane, dioxan or tetrahydrofuran. It is advisable to perform the exchange reaction using the same solution as that which results from the preparation of the lower alkyl enol ether as this avoids the further steps of isolation and purification of this material before submitting it to the action of the chosen alcohol.

The following examples are illustrative of this invention, but they are not to be construed as limiting.

Example 1.—Preparation of 3-ethyl enol ether of progesterone

To a suspension of 9 g. of finely pulverized progesterone in 10 cc. of dioxan, there is added 5 cc. of ethyl orthoformate, 10 cc. of absolute ethanol and 90 mg. of p-toluenesulfonic acid. The reaction mixture is continuously stirred at room temperature (about 15–25° C.) until solution is complete, then allowed to stand for thirty minutes, after which a few drops of pyridine are added and the solvent removed at room temperature under reduced pressure. The residue is recrystallized from dilute methyl alcohol to give the pure 3-ethyl enol ether of progesterone, melting at 106–107° C. $[\alpha]_D = -47$ (dioxan).

By substituting methyl orthoformate and methyl alcohol for ethyl orthoformate and ethyl alcohol in the above reaction the corresponding 3-methyl enol ether of progesterone is obtained.

Example 2

5 g. of 3-enol ethyl ether of progesterone in 300 cc. of benzene solution are mixed with 16 cc. of n-butyl alcohol and 0.1 g. of p-toluenesulfonic acid. The mixture is heated and distilled for about thirty minutes, so that the ethyl alcohol which forms during the reaction is completely removed. To the residual solution, a few drops of pyridine are added and the mixture concentrated under vacuum. The residue taken up with ether, filtered, dried and then recrystallized from methanol containing a trace of pyridine yields 4.9 g. of 3-enol butyl ether of progesterone melting at 70–71° C.; $[\alpha]_D = -43$ (dioxan).

Example 3

Following the procedure outlined in Example 1, there were prepared the ethyl 3-enol ethers of 6-chloro progesterone, 6-methyl-17α-acetoxy progesterone, 6-chloro-17α-acetoxy progesterone and 16α-methyl progesterone.

Then following the procedure set forth in Example 2, the ethyl 3-enol ether of 6-chloro progesterone was reacted with cyclopentyl alcohol; the ethyl 3-enol ether of 6-methyl-17α-acetoxy progesterone was reacted with n-amyl alcohol, (2-methyl) pentyl alcohol and cyclopentyl alcohol, respectively; the ethyl 3-enol ether of 6-chloro-17α-acetoxy progesterone was reacted with cyclopentyl alcohol and n-hexyl alcohol, respectively; and the ethyl 3-enol ether of 16α-methyl progesterone was reacted with n-amyl alcohol. As a result, the following new enol ethers were produced:

Cyclopentyl 3-enol ether of 6-chloro progesterone, M.P. 125° C. $[\alpha]_D = -86°$ (dioxan)
n-Amyl 3-enol ether of 6-methyl-17α-acetoxy progesterone, M.P. 85°–87° C. $[\alpha]_D = -140°$ (dioxan)
(2-methyl) pentyl 3-enol ether of 6-methyl-17α-acetoxy progesterone, M.P. 113°–115° C. $[\alpha]_D = -146°$ (dioxan)
Cyclopentyl 3-enol ether of 6-methyl-17α-acetoxy progesterone, M.P. 169°–171° C. $[\alpha]_D = -72°$ (dioxan)
Cyclopentyl 3-enol ether of 6-chloro-17α-acetoxy progesterone, M.P. 173–174° C. $[\alpha]_D = -151°$ (dioxan)
n-Hexyl 3-enol ether of 6-chloro-17α-acetoxy progesterone, M.P. 110°–112° C. $[\alpha]_D = -127°$ (dioxan)
n-Amyl 3-enol ether of 16α-methyl progesterone Example 4

In a manner similar to that outlined in Example 3, there is prepared the following new enol ethers:

n-amyl 3-enol ether of 2-methyl-17α-acetoxy progesterone
cyclopentyl 3-enol ether of 16β-methyl progesterone
n-hexyl 3-enol ether of 16α-hydroxy progesterone
n-amyl 3-enol ether of 17α-bromo progesterone
cyclohexyl 3-enol ether of 17α-bromo-6-methyl progesterone Example 5

A suspension of 20 g. of progesterone and 170 mg. of benezenesulfonic acid in a mixture of 18 cc. of tetrahydrofuran and 12 cc. of ethyl orthoformate is stirred and maintained at room temperature (about 20° C.) until solution is complete. The resulting solution is then poured into a 3 l. flask containing 1500 cc. of anhydrous benzene, 30 cc. of n-amyl alcohol and 100 mg. of benzenesulfonic acid. The mixture is heated and distilled over a period of 30 minutes in order to reduce the total volume of the solution to about ¼. Then a few drops of pyridine are added and the solvent is completely eliminated in vacuo at a temperature not higher than 30° C. The residue is taken up with methanol and recrystallized from methanol containing a few drops of pyridine, to give 3-n-amyl enol ether of progesterone melting at 66.5–68° C. $[\alpha]_D = -49$ (dioxan).

Example 6

5 g. of progesterone are suspended in 4.5 cc. of tetrahydrofuran and to the suspension there is added a mixture of 2.6 cc. of ethyl orthoformate, 4.5 cc. of absolute ethyl alcohol and 50 mg. of p-toluenesulfonic acid. After 30 minutes, the solution is poured into 800 cc. of anhydrous benzene and a mixture of 15 cc. of n-hexyl alcohol and 90 mg. of p-toluene-sulfonic acid is added. The mixture is heated to reflux for 45 minutes, then cooled and neutralized with a small amount of pyridine. After eliminating the solvent in vacuo, a residue is obtained which, suitably recrystallized from few cc. of dilute methanol, yields the 3-n-hexyl enol ether of progesterone, M.P. 73–75° C. In the same manner as above other enol ethers of progesterone are prepared including 3-sec.-butyl, isoamyl (4-methyl)pentyl (M.P. 100–102° C.), (2-methyl)pentyl, (1,3-dimethyl)butyl and (2-ethyl)butyl.

Example 7

50 mg. of sulfosalicylic acid are added to 500 cc. of anhydrous tetrahydrofuran and a portion of the solvent is distilled off to remove any possible trace of moisture. Then 3 g. of 3-methyl enol ether of progesterone in 5 cc. of cyclopentyl alcohol are added and distillation is continue in order to reduce the volume of the liquid to about ¼. After adding a few drops of pyridine, the solvent is eliminated in vacuo and the residue taken up with dilute methanol to give 3-cyclopentyl enol ether of progesterone, melting at 105–106° C.; $[\alpha]_D = -47.5$ (dioxan).

In a similar manner, cyclohexyl enol ether of progesterone, melting at 115–116.5° C.; $[\alpha]_D = -52.5$ (dioxan), and cyclohex-2-enyl enol ether of progesterone, melting at 105–107° C.; $[\alpha]_D = -55$ (dioxan), are obtained.

Example 8.—Preparation of 3-ethyl enol ether of 17α-hydroxy or acetoxy progresterone 2 g. of 17α-acetoxy progesterone are suspended in 3 cc. of tetrahydrofuran and a mixture of 2 cc. of ethyl orthoformate and 3 cc. of absolute ethyl alcohol is added. The mixture is allowed to stand for a few minutes at room temperature (about 20° C.), then 30 mg. of p-toluenesulfonic acid are added and the whole is stirred until a limpid solution is obtained. As usual, the mixture is neutralized with pyridine and the liquid is concentrated in vacuo. After a suitable recrystallization of the residue from dilute methanol, the 3-ethyl enol ether of 17α-acetoxy progesterone melting at 154–159° C.;

$$[\alpha]_D = -142$$

(dioxan) is obtained.

Similarly, 3-ethyl enol ether of 17α-hydroxy progesterone is obtained, melting at 173–175° C.; $[\alpha]_D = -110°$ (dioxan).

Example 9

By treating 4 g. of 3-enol ethyl ether of 17α-acetoxy progesterone with 12 cc. of cyclopentanol and 80 mg. of p-toluensulfonic acid as in Example 1, 3-cyclopentyl enol ether of 17α-acetoxy progesterone is obtained at melting point 157–158° C.; $[\alpha]_D = -147°$ (dioxan).

By substituting cyclohexanol in the above reaction for cyclopentanol, 3-cyclohexyl enol ether of 17α-acetoxy progesterone is prepared at melting point 162–164° C.; $[\alpha]_D = -131°$ (dioxan).

Similarly, 17α-acetoxy progesterone cyclohex-2-enyl enol ether is obtained (M.P. 154–156° C.) by reacting the corresponding ethyl enol ether with cyclohex-2-enyl alcohol.

Example 10

A mixture of 2 cc. of ethyl orthoformate, 4 cc. of absolute ethyl alcohol and 50 mg. of sulfosalicylic acid is added to a suspension of 2 g. of 17α-acetoxy progesterone in 3 cc. of tetrahydrofuran. The mixture is allowed to stand for a period of 20 minutes, after which it is poured into a boiling solution of 800 cc. benzene. 10 cc. of n-amyl alcohol are added and the resulting mixture is brought to distillaiton in order to reduce the starting volume of the solution to about ¼. Then, as usual, isolation and purification of the residue are carried out. The n-amyl enol ether of 17α-acetoxy progesterone melts at 125–126° C.; $[\alpha]_D = -126.5°$ (dioxan).

Similarly, other alkyl enol ethers of 17α-acetoxy-progesterone are obtained, including n-hexyl enol ether melting at 93–94° C.; $[\alpha]_D = -124°$ (dioxan), and (4-methyl)pentyl enol ether, melting at 154–156° C.;

$$[\alpha]_D = -142.5°$$

(dioxan).

Example 11

2.5 g. of 17α-hydroxyprogesterone, suspended in 2.5 cc. of tetrahydrofuran, are treated with a mixture of 1.8 cc. of ethyl orthoformate, 2.3 cc. of absolute ethyl alcohol and 25 mg. of p-toluenesulfonic acid. The mixture is allowed to stand at room temperature for a period of 30 minutes after which it is poured into a flask containing 450 cc. of benzene, 8 cc. of cyclopentanol and 50 mg. of p-toluenesulfonic acid. The mixture is heated to reflux for about 30 minutes, then cooled and neutralized with a few drops of pyridine and the solvent eleminated in vacuo. The residue taken up with dilute methanol gives 3-cyclopentyl enol ether of 17α-hydroxyprogesterone, melting at 184.5–186.5° C., $[\alpha]_D = -115$.

Similarly, n-amyl enol is obtained melting at 102–104° C.

Example 12

24 g. of 3-cyclopentyl enol ether of progesterone, finely pulverized, are dissolved in 1600 cc. of sesame oil. The solution is poured into 5 cc. ampules so that each ampule contains exactly 75 mg. of the active substance. Such an oil composition, which is of proper dosage, is suitable for oral ingestion when administered drop-wise.

Example 13

30 g. of 3-cyclopentyl enol ether of 17α-acetoxyprogesterone are dissolved in 4 l. of a mixture of equal parts of sesame oil and olive oil. The limpid and homogeneous solution is poured into 0.5 cc. gelatin capsules so that each capsule contains about 3.7 mg. of 3-cyclopentyl enol ether of 17α-acetoxy progesterone. The capsules provide a stable pharmaceutical composition for oral use, very effective for its therapeutic properties.

Example 14

45 g. of 3-amyl enol ether of progesterone are dissolved in 500 cc. of sunflower seed oil and the solution is poured into 0.9 cc. gelatin capsules so that each capsule contains approximately 80 mg. of active substance.

Example 15

In the same manner as in the preceding examples, hormonal preparations for oral use of 3-amyl enol ether of 17α-hydroxy or acetoxy progesterone are prepared by using sesame oil, olive oil or other vegetable oils, singly or in admixture, as liquid carriers.

I claim:
1. A compound selected from the group consisting of a compound of the formula:

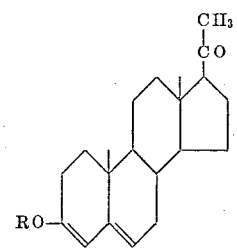

in which R is a member selected from the group consisting of cycloalkyl of four to six carbon atoms and cycloalkenyl of four to six carbon atoms and 6-methyl derivatives of said compound of said formula.

2. 3-cyclopentyl enol ether of progesterone.

References Cited
UNITED STATES PATENTS
3,342,682  9/1967  Ercoli _____ 260—397.4

ELBERT L. ROBERTS, *Primary Examiner.*